United States Patent
Corley et al.

(10) Patent No.: US 11,989,585 B1
(45) Date of Patent: May 21, 2024

(54) OPTIMIZING MEDIA TRANSCODING BASED ON LICENSING MODELS

(75) Inventors: Jonathan B. Corley, Seattle, WA (US); Tal Saraf, Seattle, WA (US); Bradley E. Marshall, Bainbridge Island, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 1247 days.

(21) Appl. No.: 13/465,960

(22) Filed: May 7, 2012

(51) Int. Cl.
G06F 9/50 (2006.01)
G06F 16/25 (2019.01)

(52) U.S. Cl.
CPC ............ G06F 9/50 (2013.01); G06F 9/5011 (2013.01); *G06F 16/258* (2019.01)

(58) Field of Classification Search
CPC ..... H04L 67/34; H04L 67/60; H04L 12/1881; G06Q 2220/18; G06Q 10/06315; G06F 21/105; G06F 8/60; G06F 9/5055; G06F 9/50; G06F 9/5005; G06F 9/5011; G06F 9/5044; G06F 2209/5021; G06F 16/258
See application file for complete search history.

(56) References Cited

U.S. PATENT DOCUMENTS

| | | | |
|---|---|---|---|
| 5,541,852 A | 7/1996 | Eyuboglu et al. | |
| 6,732,332 B1 | 5/2004 | Borysewcz et al. | |
| 6,970,602 B1 | 11/2005 | Smith et al. | |
| 7,231,023 B1 * | 6/2007 | Begeja | H04L 12/2856 370/352 |
| 7,761,900 B2 | 7/2010 | Crayford | |
| 8,634,705 B2 | 7/2014 | Yogeshwar et al. | |
| 8,855,189 B1 | 10/2014 | Krause et al. | |
| 9,058,645 B1 | 6/2015 | Corley | |
| 9,078,091 B2 | 7/2015 | Lehtiniemi et al. | |
| 9,088,634 B1 | 7/2015 | Corley | |
| 9,183,049 B1 | 11/2015 | Corley | |

(Continued)

FOREIGN PATENT DOCUMENTS

CA 2556777 C * 1/2012 ............. H04L 67/02

OTHER PUBLICATIONS

Bjorn; Architecture and performance of server-directed transcoding, ACM transactions on Internet technology, 2003, vol. 3 (4), p. 392-424.*

(Continued)

*Primary Examiner* — Ilse I Immanuel
(74) *Attorney, Agent, or Firm* — Hogan Lovells US LLP (57) ABSTRACT

A transcoding service is described that is capable optimizing media transcoding jobs according to the licensing model associated with a particular transcoder being utilized. The service can receive a request to transcode the media content from a user and inspect an SLA to determine the parameters for the transcoding job, such as the time interval to complete the job or the price of performing the job. The service can then identify a licensing cost associated with transcoding the media content. For example, the licensing cost being based at least in part on a number of running instances of the transcoder. The transcoding service may apply a weight to the licensing cost when prioritizing the transcoding jobs. For example, the service may determine an optimal number of concurrently executing transcoder instances to utilize to reduce the licensing costs associated with the transcoding jobs.

17 Claims, 6 Drawing Sheets

(56) References Cited

U.S. PATENT DOCUMENTS

| | | | |
|---|---|---|---|
| 9,189,484 | B1 | 11/2015 | Velummylum |
| 9,223,621 | B1 | 12/2015 | Corley |
| 9,292,896 | B1 | 3/2016 | Corley |
| 9,380,326 | B1 | 6/2016 | Corley |
| 9,483,785 | B1 | 11/2016 | Corley |
| 9,497,496 | B1 | 11/2016 | Corley |
| 9,510,033 | B1 | 11/2016 | Corley |
| 9,710,307 | B1 | 7/2017 | Corley et al. |
| 10,191,954 | B1 | 1/2019 | Corley et al. |
| 2002/0150247 | A1 | 10/2002 | Linnartz et al. |
| 2002/0170035 | A1 | 11/2002 | Casati et al. |
| 2003/0233464 | A1* | 12/2003 | Walpole ......... H04N 21/234327 709/231 |
| 2006/0044597 | A1 | 3/2006 | Dumitrescu |
| 2006/0168630 | A1 | 7/2006 | Davies |
| 2007/0106622 | A1* | 5/2007 | Boomershine ......... G06Q 10/06 705/400 |
| 2007/0157260 | A1 | 7/2007 | Walker |
| 2007/0162945 | A1 | 7/2007 | Mills |
| 2007/0169113 | A1* | 7/2007 | Moore ...................... G06F 8/61 717/174 |
| 2007/0174338 | A1 | 7/2007 | Liggett |
| 2008/0034393 | A1 | 2/2008 | Crayford |
| 2008/0242280 | A1 | 2/2008 | Shapiro et al. |
| 2008/0081648 | A1 | 4/2008 | Kang et al. |
| 2008/0205510 | A1 | 8/2008 | Komi et al. |
| 2008/0301588 | A1 | 12/2008 | Kumar et al. |
| 2009/0043888 | A1 | 2/2009 | Jackson |
| 2009/0083279 | A1 | 3/2009 | Hasek |
| 2009/0171674 | A1 | 7/2009 | Mitsumori |
| 2009/0172685 | A1 | 7/2009 | Shavit |
| 2009/0254672 | A1 | 10/2009 | Zhang |
| 2009/0276266 | A1 | 11/2009 | Nishiyama |
| 2009/0276716 | A1 | 11/2009 | Chua |
| 2010/0017516 | A1 | 1/2010 | Sparrell et al. |
| 2010/0054148 | A1 | 3/2010 | Murakami et al. |
| 2010/0076805 | A1 | 3/2010 | Batsakis et al. |
| 2010/0088505 | A1 | 4/2010 | Coppola et al. |
| 2010/0131674 | A1* | 5/2010 | Vecchio ............. H04N 21/2343 709/246 |
| 2010/0195540 | A1 | 8/2010 | Kerr et al. |
| 2010/0199299 | A1 | 8/2010 | Chang et al. |
| 2010/0250710 | A1 | 9/2010 | Cadwell et al. |
| 2010/0205616 | A1 | 10/2010 | Lai |
| 2010/0281042 | A1 | 11/2010 | Windes et al. |
| 2010/0309794 | A1 | 12/2010 | Keynan et al. |
| 2010/0332262 | A1 | 12/2010 | Horvitz et al. |
| 2011/0019870 | A1 | 1/2011 | Ballocca et al. |
| 2011/0082982 | A1 | 4/2011 | Harvell et al. |
| 2011/0088076 | A1 | 4/2011 | Li et al. |
| 2011/0153628 | A1 | 6/2011 | Basu et al. |
| 2011/0197221 | A1 | 8/2011 | Rouse et al. |
| 2011/0209162 | A1 | 8/2011 | Machiraju et al. |
| 2011/0310995 | A1 | 12/2011 | Dougherty, III et al. |
| 2011/0313982 | A1 | 12/2011 | Kranendonk et al. |
| 2011/0314093 | A1 | 12/2011 | Sheu et al. |
| 2012/0030341 | A1 | 2/2012 | Jensen |
| 2012/0030376 | A1* | 2/2012 | Lemus .................. H04L 67/565 709/246 |
| 2012/0072542 | A1 | 3/2012 | McGowan |
| 2012/0079054 | A1 | 3/2012 | Moroney et al. |
| 2012/0089687 | A1 | 4/2012 | Katz |
| 2012/0102154 | A1 | 4/2012 | Huang et al. |
| 2012/0131591 | A1 | 5/2012 | Moorthi et al. |
| 2012/0158645 | A1 | 6/2012 | Shafiee et al. |
| 2012/0159494 | A1 | 6/2012 | Shafiee et al. |
| 2012/0159503 | A1 | 6/2012 | Shafiee et al. |
| 2012/0192239 | A1 | 7/2012 | Harwell et al. |
| 2012/0209942 | A1 | 8/2012 | Zehavi et al. |
| 2012/0236201 | A1 | 9/2012 | Larsen et al. |
| 2012/0254456 | A1 | 10/2012 | Visharam |
| 2012/0265847 | A1 | 10/2012 | Swenson et al. |
| 2012/0272245 | A1 | 10/2012 | Rynnan |
| 2012/0278441 | A1 | 11/2012 | Li et al. |
| 2012/0331089 | A1 | 12/2012 | Vonog et al. |
| 2013/0019311 | A1 | 1/2013 | Swildens |
| 2013/0036117 | A1 | 2/2013 | Fisher |
| 2013/0054827 | A1 | 2/2013 | Feher et al. |
| 2013/0222838 | A1 | 8/2013 | Kumar |
| 2013/0243075 | A1 | 9/2013 | Dalela |
| 2014/0115592 | A1 | 4/2014 | Frean |
| 2014/0258441 | A1 | 9/2014 | L'Heureux |
| 2014/0359092 | A1 | 12/2014 | Middleton et al. |

OTHER PUBLICATIONS

Non-Final Office Action issued in U.S. Appl. No. 13/465,944 dated Sep. 24, 2014, 23 pages.

Final Office Action issued in U.S. Appl. No. 13/465,975 dated Sep. 11, 2014, 48 pages.

Non-Final Office Action issued in U.S. Appl. No. 13/465,975 dated Feb. 4, 2014, 32 pages.

Final Office Action issued in U.S. Appl. No. 13/465,978 dated Jul. 3, 2014, 26 pages.

Non-Final Office Action issued in U.S. Appl. No. 13/465,978 dated Feb. 4, 2014, 23 pages.

Non-Final Office Action issued in U.S. Appl. No. 13/465,987 dated Apr. 2, 2013, 9 pages.

Final Office Action issued in U.S. Appl. No. 13/465,987 dated Oct. 24, 2013, 10 pages.

Non-Final Office Action issued in U.S. Appl. No. 13/465,992 dated Jul. 29, 2014, 32 pages.

Non-Final Office Action issued in U.S. Appl. No. 13/465,997 dated May 1, 2014, 12 pages.

Non-Final Office Action issued in U.S. Appl. No. 13/465,997 dated Oct. 21, 2014, 14 pages.

Non-Final Office Action issued in U.S. Appl. No. 13/466,002 dated Jan. 3, 2013, 11 pages.

Final Office Action issued in U.S. Appl. No. 13/466,002 dated Jul. 19, 2013, 12 pages.

Non-Final Office Action issued in U.S. Appl. No. 13/466,002 dated Sep. 23, 2014, 12 pages.

"Non Final Office Action dated Dec. 4, 2014" received in U.S. Appl. No. 13/465,931.

"Notice of Allowance dated Mar. 27, 2015" received in U.S. Appl. No. 13/465,931.

"Final Office Action dated Feb. 20, 2015" received in U.S. Appl. No. 13/465,944.

"Non Final Office Action dated Jul. 31, 2015" received in U.S. Appl. No. 13/465,944.

"Non Final Office Action dated Jan. 16, 2015" received in U.S. Appl. No. 13/465,975.

"Non Final Office Action dated Jan. 29, 2015" received in U.S. Appl. No. 13/465,978.

"Final Office Action dated Aug. 27, 2015" received in U.S. Appl. No. 13/465,978.

"Non Final Office Action dated Jul. 17, 2015" received in U.S. Appl. No. 13/465,987.

"Final Office Action dated Feb. 23, 2015" received in U.S. Appl. No. 13/465,992.

"Non Final Office Action dated Jul. 14, 2015" received in U.S. Appl. No. 13/465,992.

"Software." The Authoritative Dictionary of IEEE Standard Terms 7th ed. 200, pp. 1067.

"Non Final Office Action dated Jun. 5, 2015" received in U.S. Appl. No. 14/682,004.

"Notice of Allowance dated Nov. 20, 2015" received in U.S. Appl. No. 14/682,004.

"Final Office Action dated Apr. 8, 2015" received in U.S. Appl. No. 13/466,002.

"Non Final Office Action dated Feb. 9, 2016" received in U.S. Appl. No. 13/466,002.

"Non Final Office Action dated Nov. 17, 2016" received in U.S. Appl. No. 14/801,784.

"Final Office Action dated Mar. 21, 2016" received in U.S. Appl. No. 13/465,944.

(56) References Cited

OTHER PUBLICATIONS

"Notice of Allowance dated Jul. 20, 2016" received in U.S. Appl. No. 13/465,944.
"Notice of Allowance dated Aug. 3, 2016" received in U.S. Appl. No. 13/465,975.
"Non Final Office Action dated Jul. 14, 2016" received in U.S. Appl. No. 13/465,978.
"Final Office Action dated Aug. 8, 2016" received in U.S. Appl. No. 13/465,987.
"Notice of Allowance dated Mar. 8, 2016" received in U.S. Appl. No. 13/465,992.
"Notice of Allowance dated Jul. 20, 2016" received in U.S. Appl. No. 13/466,002.
Final Office Action dated Jun. 16, 2017 issued in corresponding U.S. Appl. No. 14/801,784.
Non-Final Office Action dated Mar. 26, 2018 issued in corresponding U.S. Appl. No. 14/801,784.
Final Office Action dated Sep. 5, 2018 issued in corresponding U.S. Appl. No. 14/801,784.
Non-Final Office Action dated Feb. 26, 2019 issued in corresponding U.S. Appl. No. 14/801,784.
Non-Final Office Action issued in U.S. Appl. No. 15/339,460 dated May 3, 2019.
Non-Final Office Action dated Jun. 2, 2017 issued in corresponding U.S. Appl. No. 15/362,617.
Final Office Action dated Dec. 28, 2017 issued in corresponding U.S. Appl. No. 15/362,617.
Non-Final Office Action dated Jun. 19, 2018 issued in corresponding U.S. Appl. No. 15/362,617.
Final Office Action dated Feb. 19, 2019 issued in corresponding U.S. Appl. No. 15/362,617.
Non-Final Office Action dated Jun. 24, 2019 issued in corresponding U.S. Appl. No. 15/362,617.
"Notice of Allowance dated Mar. 27, 2017" received in U.S. Appl. No. 13/465,978.
"Non-Final Office Action dated Nov. 28, 2018" received in U.S. Appl. No. 15/627,137.
"Final Office Action dated Mar. 18, 2019" received in U.S. Appl. No. 15/627,137.
"Non-Final Office Action dated Aug. 8, 2017" issued in corresponding U.S. Appl. No. 13/465,987.
"Final Office Action dated Dec. 27, 2017" issued in corresponding U.S. Appl. No. 13/465,987.
"Notice of Allowance dated Sep. 20, 2018" issued in corresponding U.S. Appl. No. 13/465,987.
Anonymous, Altair Introduces Advanced Scheduling Features With PBS Professionals, 9.2 Eligible Time, Turnable Formula AND Standing Reservations Help Customers Achieve Higher ROI, May 20, 2008, PR Newswire.
Buyya et al., "Cloud Computing: Principles and Paradigms".
Notice of Allowance issued in co-related U.S. Appl. No. 15/339,460 dated Sep. 18, 2019.
Notice of Allowance issued in co-related U.S. Appl. No. 15/362,617 dated Jan. 15, 2020.
Non-Final Office Action issued in co-related U.S. Appl. No. 15/627,137 dated Jul. 25, 2019.
Final Office Action issued in co-related U.S. Appl. No. 15/627,137 dated Jan. 2, 2020.
Non-Final Office Action dated Apr. 20, 2020 received in U.S. Appl. No. 15/627,137.
Notice of Allowance dated Jul. 22, 2020 received in U.S. Appl. No. 15/627,137.
Couvares P., Kosar T., Roy A., Weber J., Wenger K. (2007) Workflow Management in Condor. In: Taylor I.J., Deelman E., Gannon D.B., Shields M. (eds) Workflows for e-Science. Springer, London (Year: 2007).

* cited by examiner

OPTIMIZING MEDIA TRANSCODING BASED ON LICENSING MODELS

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

Generally, transcoding often refers to the decoding and recoding of digital content from one format to another. Transcoding is sometimes necessary to enable playback of media on different devices. It can be used to convert a digital audio, video file, and video streams from one digital form or codec to another (e.g. MPEG2 to h.264 transcoding). Most encoders/transcoders are proprietary and thus are provided under a license that governs their usage. While some licenses are free (e.g. open source licenses), many others specify various fees and charges for using the software. For certain systems, such as service providers that transcode large amounts of media, these licensing fees can become a considerable cost factor for doing business.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for transcoding content. In particular, the various embodiments provide approaches for optimizing the transcoding of content, such as media content, based at least in part on the various licensing models associated with the transcoders and/or encoders that are used.

In accordance with various embodiments, a transcoding service or system is described, that prioritizes transcoding jobs based at least in part on the licensing fees incurred for performing the transcoding jobs. In accordance with an embodiment, the transcoding service can be provided by a service provider (e.g. cloud computing provider) or other such entity. The service can enable a user (e.g. content publisher) to provide media content and request that the media content be transcoded into one or more different formats. The user may also specify a set of parameters for performing the transcoding, such as a price that the user is willing to pay to have the media transcoded and a time interval (e.g. maximum time) to complete the transcoding. In accordance with an embodiment, the parameters can be stored in a service level agreement (SLA) associated with the user.

In accordance with an embodiment, once the transcoding service has received the request to perform the transcoding job, the service may determine a licensing cost associated with the transcoding job. The licensing cost may be specified in a software license associated with the particular encoder that may be used to perform the transcoding job. The cost may be computed according to a wide variety of different methods. For example, some licenses specify a charge per each unique instance of transcoding (e.g. a transcoding job being executed for a specific user). Other licenses may specify a charge per virtual instance that is independent of which user has requested the transcoding job. Yet other licenses specify that the instance is purchased for a period of time (e.g. one year, one month, one hour, etc.).

In accordance with an embodiment, the transcoding service can apply a weight based on the licensing cost when prioritizing or scheduling the transcoding job. The prioritizing can then optimize the transcoding job, taking into consideration factors such as the parameters specified in the SLA (e.g. the time and price of transcoding) and the determined licensing costs. In at least one embodiment, the transcoding service can determine how many concurrent instances of transcoding should be launched to reduce the licensing costs while still satisfying the SLA requirements. For example, if the SLA specifies a long time interval to perform the transcoding (e.g. one week), and if the encoder license is charged per each unique running instance of the encoder, the service may opt to minimize the number of concurrently running instances to as few as possible while still satisfying the SLA time requirement that the job be completed in one week. By way of another example, the license for each instance may be long lived (e.g. one year) and the service may determine that a large number of instances have already been purchased for the user. In that case, the transcoding service may opt to utilize more concurrently running instances to perform the transcoding job faster since the additional instances will not incur any additional licensing costs.

In cases where licensing costs are based on the number of servers used for transcoding, the service may prioritize the transcoding jobs according to the demand for servers under the license. For example, if the number of servers allocated for a particular encoding type (e.g. H.264, MPEG-2, etc.) is approaching some predetermined limit, the service may opt to delay some transcoding jobs and/or allocate additional servers for other encoding types. If the user has requested a large workload of media to be transcoded, the service may perform one type of encoding before another type of encoding (e.g. encoding type currently constrained by the number of licenses) and offer a discount to the user for the delay or charge the user a higher price if the user needs the encoding to be performed immediately. In another example, the service may schedule all of the various users' transcoding jobs across the resources (e.g. servers) in order to optimize on licensing costs.

In accordance with various embodiments, when certain servers are underutilized, the transcoding service may offer lower prices for users that request media to be transcoded. When certain license limits are exceeded, the users may be charged higher prices because the service provider may incur additional licensing costs for exceeding the limits. Many other examples of using the licensing costs to optimize the transcoding of media are possible within the scope of the embodiments described herein. In various embodiments, the transcoding service can optimize and prioritize the performing of various transcoding jobs based at least in part on licensing costs associated with those jobs.

Throughout the various embodiments described herein, the license and the licensing costs may vary on a wide number of factors. For example, the licensing costs may be charged per instance the transcoding service instantiates, per user on whose behalf the license was acquired, per number of transcoding instances (e.g. processes), per number of servers being utilized to perform the transcoding, or according to any other factor that may be specified in the license.

It should be noted that throughout this disclosure, the terms "encoder" and "transcoder" are often used interchangeably and are intended to cover any software, hardware or combination thereof used to convert digital media content from one format into another, or otherwise modify the content. In various embodiments, a transcoder or an encoder may perform a function such as transcoding the media content from one format into another format; transmuxing the media content; digital watermarking the media content; segmenting the media content; applying access controls to the media content; adding meta data to the media content; inserting advertisements into the media content; translating the media content into a different language; transcribing the media content; changing bit rates of the media content; sequencing the media content; adding audio to the media content, or the like.

Figure 1:
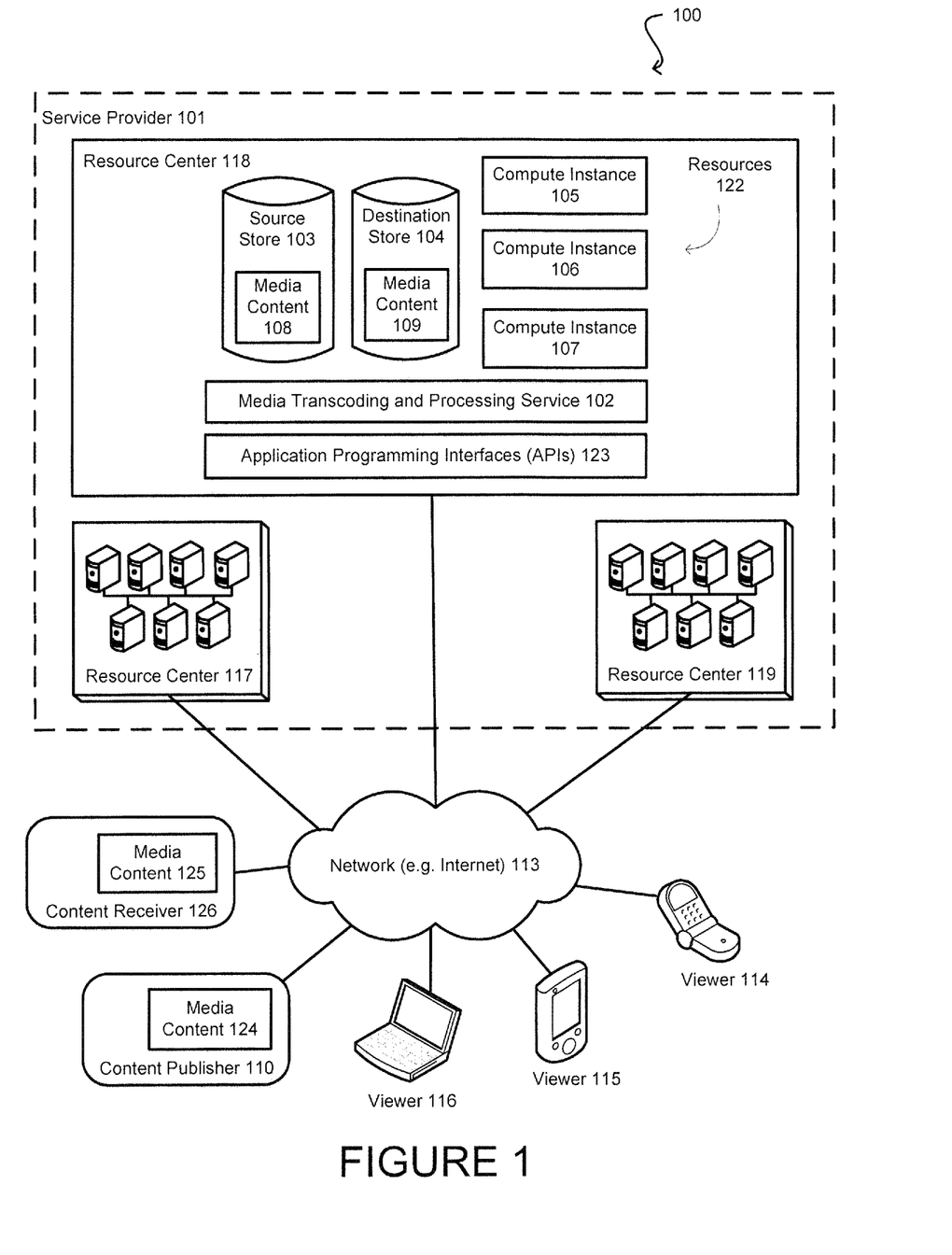
FIG. 1 illustrates an example of an environment in which the transcoding service can be utilized, in accordance with various embodiments.

FIG. 1 illustrates an example of an environment 100 in which the transcoding service can be utilized, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings.

Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other processing of content contained in this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the service, such as a transcoding service. As one option, the pricing of a transcoding service could be based at least in part on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

Figure 2:
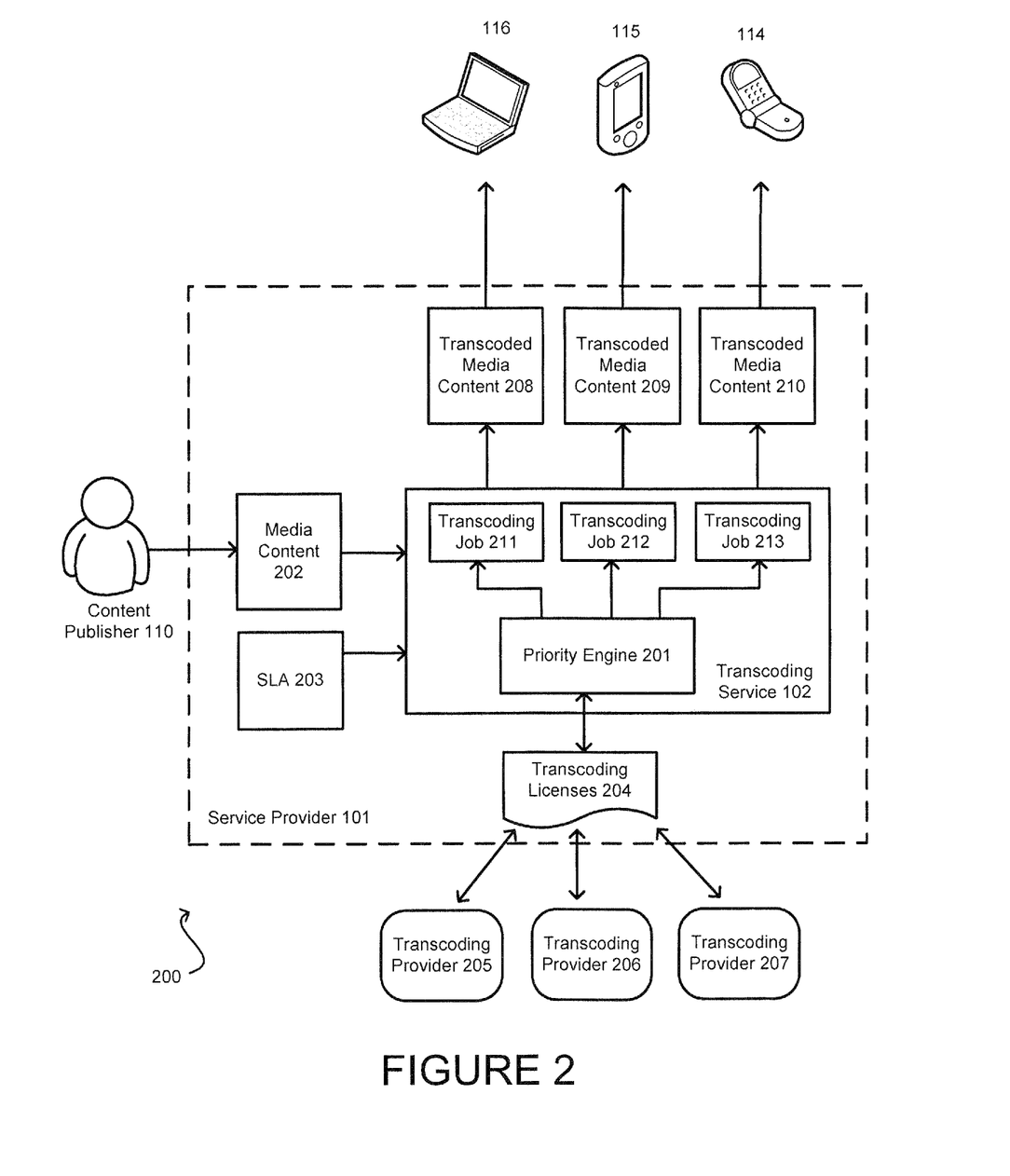
FIG. 2 is an example of an environment where the transcoding service prioritizes transcoding jobs based at least in part on the licensing costs, in accordance with various embodiments.

FIG. 2 is an example of an environment 200 where the transcoding service prioritizes transcoding jobs based at least in part on the licensing costs, in accordance with various embodiments.

In the illustrated, embodiment, a content publisher 110 provides a set of media content 202 to be transcoded to the service provider 101. The media content may be provided in a source encoding format (e.g. MPEG-2) and requested to be transcoded into one or more other formats. Some examples of the various media encoding formats may include but are not limited to H.264/MPEG-4 AVC, M-JPEG, MPEG-4, OGG-Theora, VP8-WebM, VC1 (SMPTE), as well as any other media formats and encodings that are known in the art. In addition to requesting the transcoding of media, the content publisher 110 may specify certain transcoding parameters, such as the maximum time interval to complete the transcoding or a price that the publisher is willing to pay to perform the transcoding. These parameters may be captured in a service level agreement (SLA) 203 stored on the system.

In accordance with an embodiment, upon receiving the transcoding request, the transcoding service 102 may determine one or more licensing costs associated with the transcoding request. The transcoding service 102 may inspect the transcoding licenses 204 of the various transcoding providers (205, 206, 207) to determine the licensing fees for using a given encoder/transcoder. For example, the service may determine that the license for using an encoder provided by the transcoding provider 207 computes a charge based on each unique running instance of the encoder associated with a specific user. Similarly, the service may determine that the transcoding provider's 206 license specifies that the licensing fee be computed on a per-machine instance (e.g. virtual machine) basis, regardless of which user is performing the transcoding. For example, the virtual instance may be purchased for a period of 24 hours for a specific fee and can be used to perform transcoding jobs for multiple users during those 24 hours. Various other licensing schemes are possible within the scope of the embodiments described herein.

In accordance with the illustrated embodiment, the transcoding service 102 can utilize a priority engine 201 to prioritize the transcoding jobs (211, 212, 213) according a set of factors, including at least the licensing costs associated with the jobs. For example, the transcoding service 102 may increase or decrease the number of concurrently executing instances, servers or various other servers to optimize the costs of performing the transcoding jobs, while satisfying the requirements specified in the SLA 203. Similarly, the transcoding service may analyze the entire workload of the content publisher 110 and perform certain types of encoding before or after other types of encoding depending at least in part on the transcoding license 204 information. For example, if the system is currently using a large number of instances of a particular encoder, it may choose to delay the transcoding job using the license-constrained encoder in favor of other transcoding jobs, rather than incur additional licensing fees.

In accordance with an embodiment, the priority engine 201 considers the SLA requirements and the weight applied to the licensing costs when prioritizing the various transcoding jobs. For example, if the SLA allows a long period of time to perform the transcoding and the licensing costs are set to heavily influence the price of transcoding, the prioritization engine may limit the number of concurrently executing transcoding instances to save on licensing costs. Conversely if the SLA time requirement is short (e.g. 5 minutes), the transcoding service may need to utilize a large number of concurrently running instances to satisfy the timing requirement.

In accordance with various embodiments, the transcoding service 102 may complete the transcoding jobs to produce transcoded media content (208, 209, 210) in various formats. This transcoded content may be made available to the various viewer devices (114, 115, 116), such as mobile phones, personal computers, laptops and the like.

Figure 3:
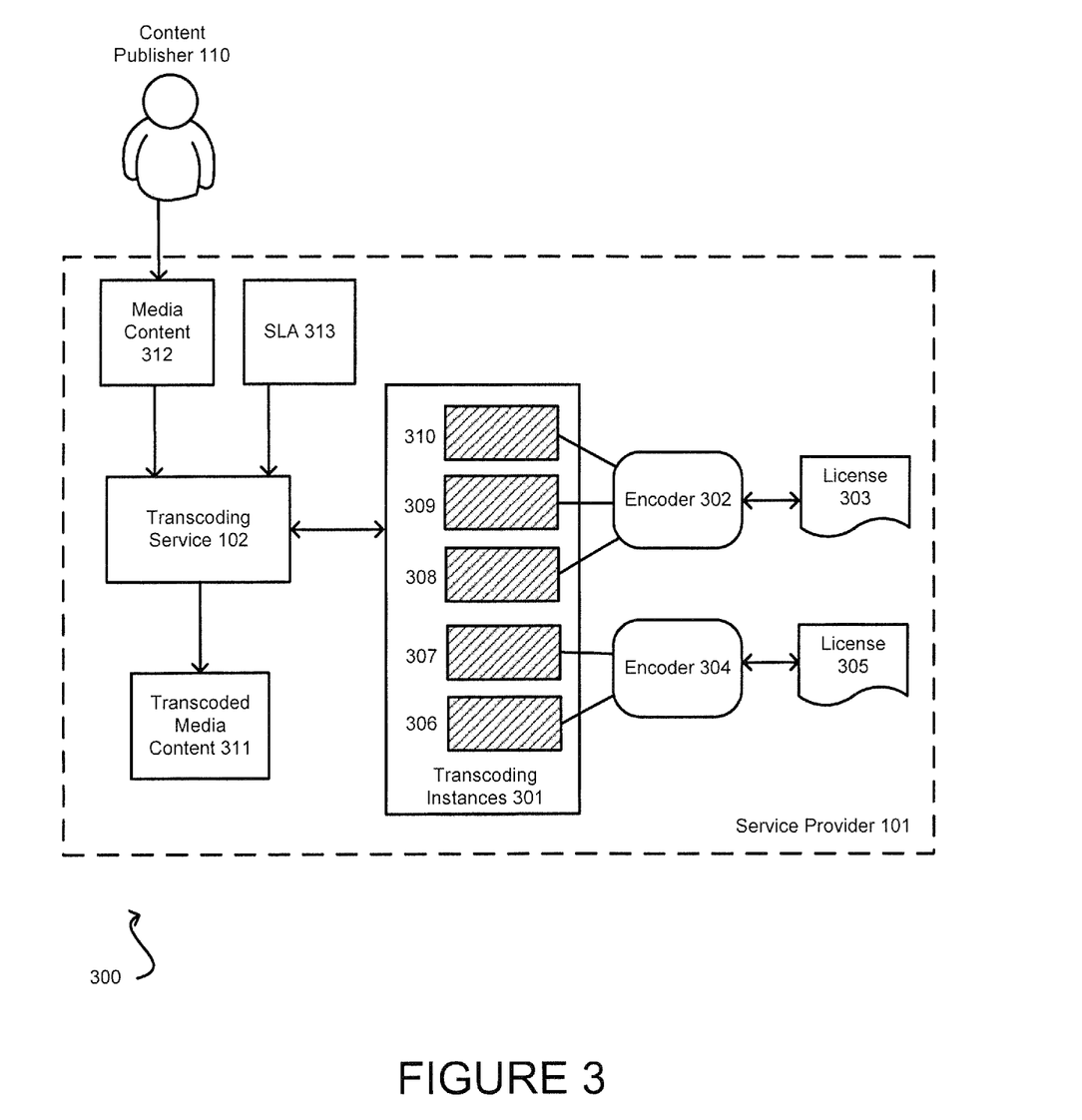
FIG. 3 illustrates an example of the transcoding service that can adjust the number of concurrently executing transcoding instances based on licensing costs, in accordance with various embodiments.

FIG. 3 illustrates an example 300 of the transcoding service that can adjust the number of concurrently executing transcoding instances based on licensing costs, in accordance with various embodiments.

In the illustrated embodiment, the content publisher 110 provides media content 312 (e.g. video, audio, or multimedia file) to the service provider 101 for transcoding. In addition, the content publisher may specify the time interval, cost and other parameters in the SLA 313 associated with the request. The transcoding service 102 can inspect the SLA and optimize the transcoding of the media content 312 taking into account the licensing costs associated with the transcoding job.

In accordance with an embodiment, the transcoding service 102 can employ one or more encoders (302, 304) to perform the transcoding of the media content 302 to produce a version of transcoded content 308. Each encoder can have a license (303, 305) associated therewith, which governs the legal usage and specifies the costs for using the encoder. In accordance with the illustrated embodiment, the license costs may be based at least in part on the number of instances of the encoder that are used to perform transcoding jobs. For example, the license 303 may specify that a unique instance (specific to a particular user) may be purchased and used for 1 year at a predetermined price. The service provider 101 may purchase as many instances for the content publisher 110. By way of another example, license 305 may specify that a virtual instance can be purchased for 1 month to be used for any user's transcoding jobs.

In accordance with an embodiment, the transcoding service may optimize the transcoding job to minimize or reduce the licensing costs associated with the transcoding. For example, the transcoding service 102 may determine an optimal number of concurrently executing instances (306, 307, 308, 309, 310) of encoders (302, 304) to use to perform the transcoding jobs. For example, if the SLA 303 specifies that the transcoding job can be performed over a long time interval, the service may minimize the number of concurrently executing instances of the encoder to reduce licensing costs incurred by transcoding. In this case, the transcoding may potentially take the longest time allowed under the SLA; however it would reduce the encoder licensing costs for the content publisher.

In accordance with an embodiment, if the content publisher has already incurred the licensing costs for a particular number of encoder instances and some of those instances are not currently being utilized, the service may allocate additional instances to perform the transcoding job in a faster time interval. For example, the content publisher may have purchased licenses for using 50 instances of an encoder in the previous month and this month, the content publisher may only need 25 instances to perform the transcoding jobs in the time allotted under the SLA. In this case, the service provider may launch an additional 25 instances to perform the transcoding job at a faster rate since the licensing costs have already been incurred for the additional instances.

In some embodiments, the system may utilize the available licenses for which the licensing fees have already been incurred to complete the transcoding job faster, however, in certain cases, the system may delay the reporting of the results until the time interval guaranteed in the SLA. This can be done in order to prevent users that paid less amounts than other users from getting the same (or better) transcoding performance than users that have paid more to obtain a higher SLA.

In accordance with the illustrated embodiment, if the license is not associated with a particular user, the transcoding service 102 may apply underutilized instances to the transcoding jobs of another user of the service. For example, if the license to use an instance for one month has been acquired to perform a job for one user, and if that user is not using the instance any longer, the service may apply the instance to transcoding jobs of another user to reduce the costs of operating the service, or to provide savings for the various users.

In accordance with some embodiments, licensing costs may be based on the number of servers used for transcoding. In this case, the transcoding service 102 may prioritize the transcoding jobs across the fleet of servers according to the demand for servers under a particular license. For example, the service provider 101 may have acquired licenses of a particular encoder for a certain number of servers. If the number of servers being used for that encoder is approaching that limit, the transcoding service may delay some transcoding jobs and/or allocate additional servers for other encoding types. For example, the service may inspect the entire workload of the content publisher and choose to perform the less constrained types of encoding before starting the transcoding jobs for the encoder which has a low number of servers available. Alternatively, the service may offer a higher price to the content publisher if the content publisher requires the service provider to obtain licenses for additional servers to finish the transcoding sooner.

In accordance with other embodiments, the transcoding service 102 may prioritize to complete the transcoding job in the time frame during which there are available licenses, without having to acquire new licenses. For example, upon receiving a request to transcode, the service may determine whether the request can be completed using the available licenses before the licenses expire, and adjust the number of concurrent instances/servers in order to complete the transcoding before expiration in order to avoid having to purchase additional licenses.

Figure 4:
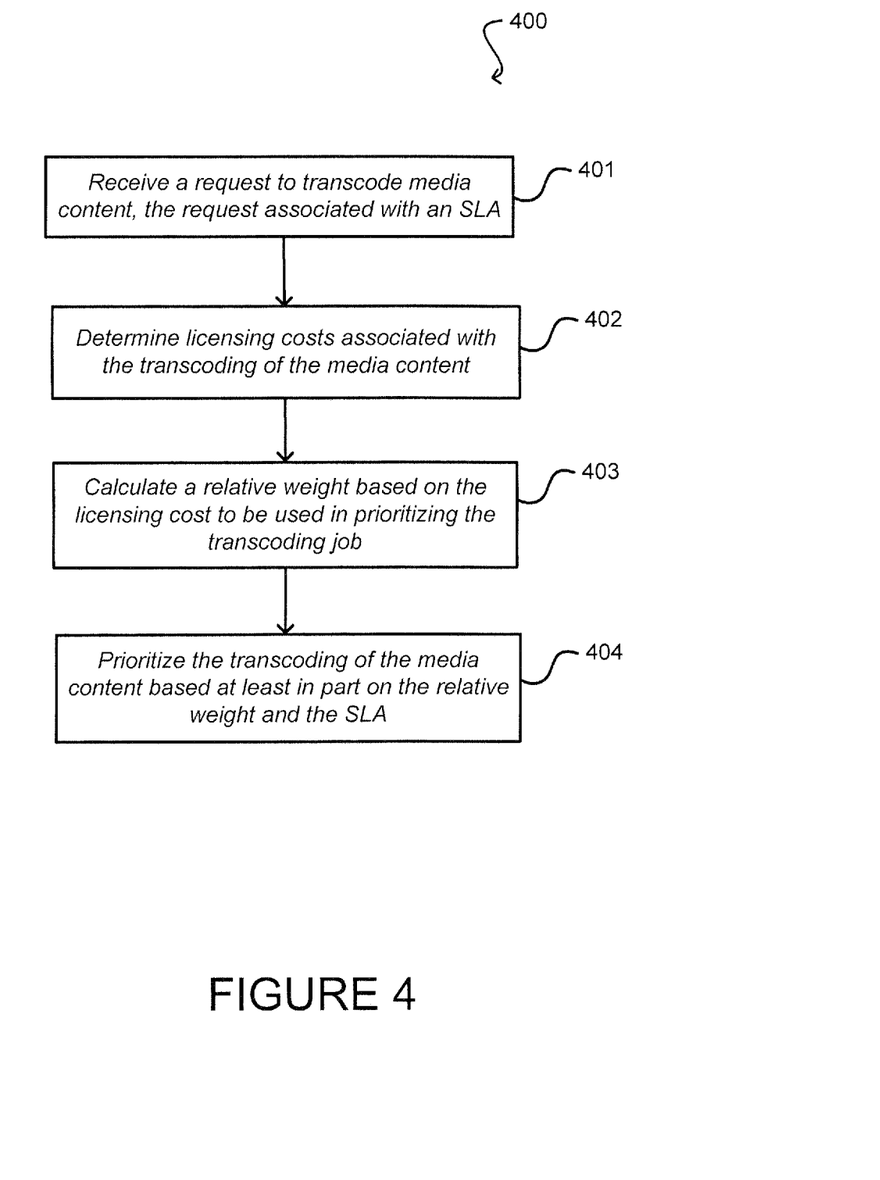
FIG. 4 illustrates an example process for prioritizing the transcoding job according to licensing costs, in accordance with various embodiments.

FIG. 4 illustrates an example process 400 for prioritizing the transcoding job according to licensing costs, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the service receives a request to transcode a set of media content. The request may be associated with a particular service level agreement (SLA) that defines the parameters for transcoding the media content. For example, the SLA may specify the maximum price and/or a maximum time interval to perform the transcoding.

In at least one embodiment, the SLA may be persisted in the system as a file, such as an extensible markup language (XML) file.

In operation 402, the service can determine a licensing cost associated with the transcoding job. In one embodiment, the service can inspect the license associated with the encoder that will be used to perform the transcoding and compute one or more charges that will need to be applied to the transcoding job. For example, the service may determine that the transcoding job will cost $2 for each running instance of the encoder used to perform the transcoding job.

In operation 403, the service calculates a relative weight based at least in part to the licensing costs, where the relative weight will be used to prioritize the transcoding job. In various embodiments, a weight function is a mathematical construct to apply more (or less) weight (i.e. influence) to a particular element, such as the licensing cost. For example, if the licensing cost for each additional instance of the encoder is high, the weighting may be set to 10, indicating that the licensing cost is a significant influence on the pricing of the transcoding job. Conversely if the encoder is provided under a free open source license, the weighting may be set to 0, indicating that it should not influence any cost considerations in the prioritization of the transcoding job. Any weighting scheme can be applied to the prioritization of transcoding within the scope of various embodiments described herein.

In operation 404, the service prioritizes the transcoding of the media content according to the relative weight of the licensing cost and the SLA requirements. For example, if the licensing costs are weighted heavily and the time frame is long, the service may attempt to prioritize the transcoding to minimize or reduce the number of licenses required. On the other hand, if the licensing costs are not substantial, the service may obtain a larger number of licenses to complete the transcoding in a shorter timeframe.

Figure 5:
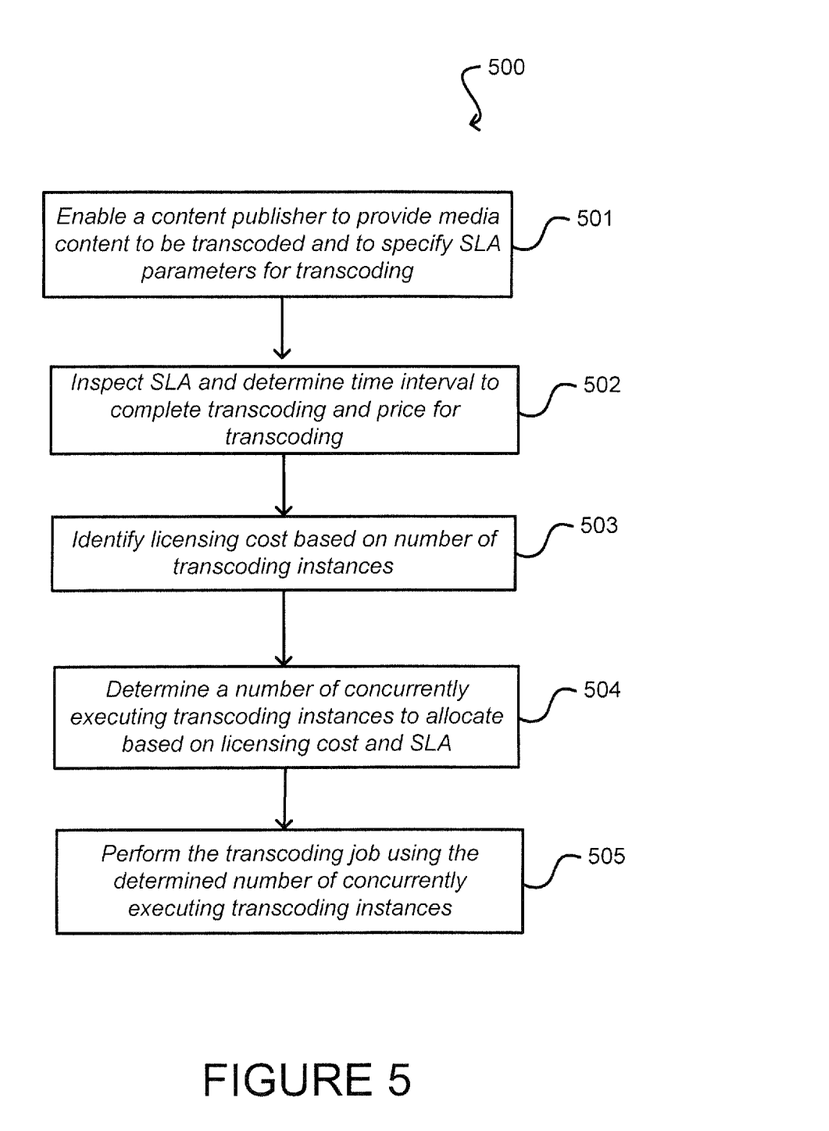
FIG. 5 illustrates an example of a process for optimizing the number of concurrently executing transcoding instances based at least in part on licensing costs, in accordance with various embodiments.

FIG. 5 illustrates an example of a process 500 for optimizing the number of concurrently executing transcoding instances based at least in part on licensing costs, in accordance with various embodiments.

In operation 501, a service provider may provide a transcoding service that enables any user (e.g. a content publisher) to request transcoding of various media content. In one embodiment, the user may also have an SLA set up with the service provider, where the SLA specifies various parameters for performing the transcoding job.

In operation 502, upon receiving a request to transcode the media, the service inspects the SLA and determines a time interval to perform the transcoding job and a price that the user is willing to pay for the transcodes. For example, the user may specify that the transcoding of the media content should be completed in less than 10 minutes at a price not to exceed $1 per output minute. In some cases, the user may not specify a time interval, such as requesting the service to perform the transcoding at the lowest possible price regardless of the time taken to complete the job.

In operation 503, the service identifies the licensing cost for the transcoding job. In at least one embodiment, the licensing cost may be based at least in part on a number of instances of a particular encoder or transcoder. For example, the licensing cost may be charged per unique instance of an encoder allocated to a specific user. In some embodiments, the licensing cost may take into account whether a licensing cost for the instance has already been paid and thus there are available licenses for a particular period of time to be used with transcoding without incurring any additional licensing costs. For example, if a number of licenses have already been purchased that last for one month, the licensing cost for using those licenses may be nothing since the expense has already been incurred. In that case, the system may utilize those instances to complete the transcoding job faster.

In operation 504, the service determines an optimal number of concurrently executing instances to allocate to the transcoding job. In accordance with an embodiment, the number of instances may be determined based at least in part on the license costs in light of the SLA requirements. For example, if the SLA timeframe allows for it, the service may minimize the number of concurrently instances to reduce the licensing costs incurred, as previously described. Alternatively, the service may increase the number of instances to certain jobs, adjust the scheduling of certain transcoding instances to certain jobs and perform various other tuning of the number of instances.

In operation 505, the service may carry out the transcoding job using the determined number of transcoding instances. In accordance with an embodiment, the transcoding job may produce output media in one or more different formats.

Figure 6:
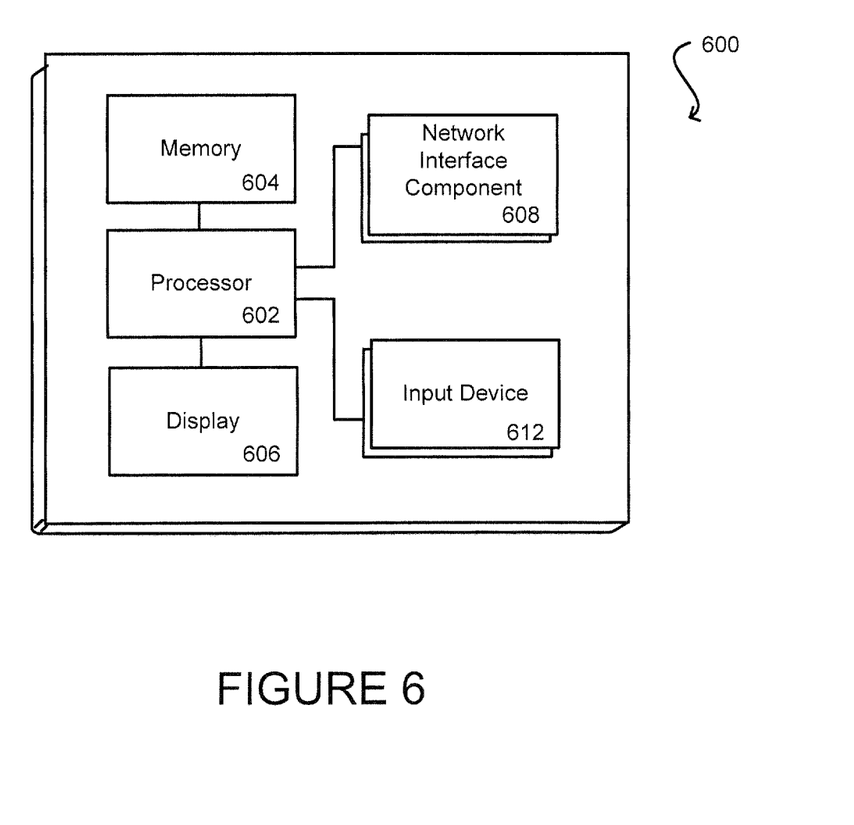
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard. mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining at least one first request to execute one or more transcoding jobs to transcode media content from a first format to a second format, the at least one first request associated with one or more parameters including at least one of (a) a time interval for completing the one or more transcoding jobs and (b) a value for performing the one or more transcoding jobs;
determining a relative weight to be applied to each of the one or more transcoding jobs, each relative weight based at least in part on the one or more parameters associated with the respective transcoding jobs and a server cost of one or more server resources under demand for the one or more transcoding jobs;
identifying a first number of compute instances comprising at least one compute instance for each of a plurality of transcoders capable of being provided by a set of computing resources, the at least one compute instance comprising the one or more server resources under demand for the one or more transcoding jobs, wherein each compute instance includes a processing capacity and memory;
allocating a first set of transcoding instances for the one or more transcoding jobs, the first set of transcoding instances selected from the first number of compute instances based at least in part on the relative weight associated with each of the one or more transcoding jobs, the demand for the one or more server resources, and the time interval for completing the one or more transcoding jobs, wherein each transcoding instance performs an execution of an individual transcoding job;
determining whether to delay, based at least in part on the demand for the one or more server resources, at least one of the one or more transcoding jobs allocated for the first set of transcoding instances;

transcoding, concurrently, within the one or more parameters, the media content of the one or more transcoding jobs into a specific format using the first set of transcoding instances;

obtaining an at least one second request to execute the one or more transcoding jobs;

determining a second relative weight associated with the one or more transcoding jobs of the at least one second request;

allocating a second set of transcoding instances for the one or more transcoding jobs in the at least one second request, the second set of transcoding instances selected from the first number of compute instances based at least in part on the relative weight associated with each of the one or more transcoding jobs of the first at least one request and the at least one second request, the demand for the one or more server resources, and the time interval, the second set of transcoding instances differing at least in part from the first set of transcoding instances;

allocating additional transcoding instances than are needed for the time interval, wherein a licensing cost has already been incurred for the additional transcoding instances;

transcoding, concurrently, the media content of the one or more transcoding jobs in the at least one second request into a specific format using the second set of transcoding instances and the additional transcoding instances; and delaying reporting of a result of the one or more transcoding jobs to a user that requested the transcoding job until the time interval associated with the first request has elapsed.

2. The computer-implemented method of claim 1, wherein at least one transcoding license for one of the plurality of transcoders is based at least in part on a number of associated transcoding instances, and wherein the allocating the first set of transcoding instances further includes:
minimizing a number of concurrently executing transcoding instances to perform the one or more transcoding jobs within the time interval associated with the at least one first request.

3. The computer-implemented method of claim 1, wherein at least one transcoding license is based at least in part on a number of unique transcoding instances, each unique transcoding instance being specific to the user, wherein the allocating the first set of transcoding instances further includes:
determining that the user has one or more unique transcoding instances available for which a licensing cost has already been incurred; and
assigning the one or more available unique transcoding instances to perform the one or more transcoding jobs of the user.

4. The computer-implemented method of claim 1, wherein determining a change in the relative weight includes determining the expiration for transcoding license, and wherein allocating the second set of transcoding instances is based at least in part on a transcoding license expiration associated with the second set of transcoding instances.

5. The computer-implemented method of claim 1, wherein the at least one first request to execute the one or more transcoding jobs is received from a content publisher to a service provider, the service provider providing a multi-tenant computing environment of shared resources that are capable of transcoding the media content.

6. The computer-implemented method of claim 1, further comprising:
performing, after transcoding the media content, one or more of:
transmuxing the media content; digital watermarking the media content;
segmenting the media content; applying access controls to the media content;
adding meta data to the media content;
inserting advertisements into the media content;
translating the media content into a different language;
transcribing the media content;
changing bit rates of the media content;
sequencing the media content; or
adding audio to the media content.

7. The computer-implemented method of claim 1, wherein the allocating the first set of transcoding instances further includes:
determining that a transcoding license is being used; and
delaying the execution of at least one of the one or more transcoding jobs.

8. A system, comprising:
a processor; and
a non-transitory computer readable medium comprising executable instructions that, when executed by the processor, cause the system to perform a method comprising:
receive a first request to execute one or more transcoding jobs for transcoding media content from a first format to a second format, the first request associated with one or more parameters including at least a time interval for completing the one or more transcoding jobs, and a value for performing the one or more transcoding jobs;
determine a relative weight to be applied to each of the one or more transcoding jobs, each relative weight based at least in part on the one or more parameters associated with the respective transcoding jobs and a server cost of one or more server resources under demand for the one or more transcoding jobs;
identify a first number of compute instances comprising at least one compute instance for each of a plurality of transcoders capable of being provided by a set of computing resources, the at least one compute instance comprising the one or more server resources under demand for the one or more transcoding jobs, wherein each compute instance includes a processing capacity and memory;
allocate a first set of transcoding instances for the one or more transcoding jobs, the first set of transcoding instances selected from the first number of compute instances based at least in part on the relative weight associated with each of the one or more transcoding jobs, the demand for the one or more server resources, and the time interval, wherein each transcoding instance performs an execution of an individual transcoding job;
determine whether to delay, based at least in part on the demand for the one or more server resources, at least one of the one or more transcoding jobs allocated for the first set of transcoding instances;
transcode, concurrently, within the one or more parameters, the media content of the one or more transcoding jobs into a specific format using the first set of transcoding instances;
obtain a second request to execute the one or more transcoding jobs;

determine a second relative weight associated with the one or more transcoding jobs of the second request;

allocate a second set of transcoding instances for the one or more transcoding jobs in the second request, the second set of transcoding instances selected from the first number of compute instances based at least in part on the relative weight associated with each of the one or more transcoding jobs of the first request and the second request, the demand for the one or more server resources, and the time interval, the second set of transcoding instances differing at least in part from the first set of transcoding instances;

allocating additional transcoding instances than are needed for the time interval, wherein a licensing cost has already been incurred for the additional transcoding instances;

transcode, concurrently, the media content of the one or more transcoding jobs in the second request into a specific format, using the second set of transcoding instances and the additional transcoding instances; and delay reporting of a result of the one or more transcoding jobs to a user that requested the transcoding job until the time interval associated with the first request has elapsed.

9. The system of claim 8, wherein at least one transcoding license for one of the plurality of transcoders is based at least in part on a number of transcoding instances, and wherein allocating the first number of transcoding instances further includes:

minimizing a number of concurrently executing transcoding instances to perform the one or more transcoding jobs within the time interval associated with the first request.

10. The system of claim 8, wherein at least one transcoding license is based at least in part on a number of unique transcoding instances, each unique transcoding instance being specific to the user, wherein allocating the first number of transcoding instances further includes:

determine that the user has one or more unique transcoding instances available for which a licensing cost has already been incurred; and assign the one or more available unique transcoding instances to perform the one or more transcoding jobs of the user.

11. The system of claim 8, wherein the instructions to determine a change in the relative weight further comprise instructions to determine expirations for each of the transcoding licenses, and wherein allocating the second set of transcoding instances is based at least in part on the respective expirations.

12. The system of claim 8, wherein the system is further configured to provide a multi-tenant computing environment of shared resources that are capable of transcoding the media content.

13. The system of claim 8, further comprising:

performing, after transcoding the media content, one or more of:

transmuxing the media content; digital watermarking the media content;

segmenting the media content; applying access controls to the media content;

adding meta data to the media content; inserting advertisements into the media content;

translating the media content into a different language; transcribing the media content; changing bit rates of the media content; sequencing the media content; or adding audio to the media content.

14. The system of claim 8, wherein allocating the first number of transcoding instances further includes:

determining that a transcoding license is being used; and delaying the execution of at least one of the one or more transcoding jobs.

15. A non-transitory computer readable storage medium comprising computer-readable instructions, the computer-readable instructions executable by one or more processors to perform a method comprising:

receiving a first request to execute one or more transcoding jobs for transcoding media content from a first format to a second format, the first request associated with one or more parameters including at least a time interval for completing the one or more transcoding jobs, and a value for performing the one or more transcoding jobs;

determining a relative weight to be applied to each of the one or more transcoding jobs, each relative weight based at least in part on the one or more parameters associated with the respective transcoding jobs and a server cost of one or more server resources under demand for the one or more transcoding jobs;

identifying a first number of compute instances comprising at least one compute instance for each of a plurality of transcoders capable of being provided by a set of computing resources, the at least one compute instance comprising the one or more server resources under demand for the one or more transcoding jobs, wherein each compute instance includes a processing capacity and memory;

allocating a first set of transcoding instances for the one or more transcoding jobs, the first set of transcoding instances selected from the first number of compute instances based at least in part on the relative weight associated with each of the one or more transcoding jobs, the demand for the one or more server resources, and the time interval, wherein each transcoding instance performs an execution of an individual transcoding job;

determining whether to delay, based at least in part on the demand for the one or more server resources, at least one of the one or more transcoding jobs allocated for the first set of transcoding instances;

transcoding, concurrently, within the one or more parameters, the media content of the one or more transcoding jobs into a specific format using the first set of transcoding instances;

obtaining a second request to execute the one or more transcoding jobs;

determining a second relative weight associated with the one or more transcoding jobs of the second request;

allocating a second set of transcoding instances for the one or more transcoding jobs in the second request, the second set of transcoding instances selected from the first number of compute instances based at least in part on the relative weight associated with each of the one or more transcoding jobs of the first request and the second request, the demand for the one or more server resources, and the time interval, the second set of transcoding instances differing at least in part from the first set of transcoding instances;

allocating additional transcoding instances than are needed for the time interval, wherein a licensing cost has already been incurred for the additional transcoding instances;

transcoding, concurrently, the media content of the one or more transcoding jobs in the second request into a specific format, using the second set of transcoding instances and the additional transcoding instances; and delaying reporting of a result of the one or more transcoding jobs to a user that requested the transcoding job until the time interval associated with the first request has elapsed.

16. The non-transitory computer readable storage medium of claim 15, wherein at least one transcoding license for the plurality of transcoders is based at least in part on a number of transcoding instances, and wherein the executing the one or more transcoding jobs further includes:

minimizing a number of concurrently executing transcoding instances to perform the one or more transcoding jobs within the time interval associated with the first request.

17. The non-transitory computer readable storage medium of claim 15, wherein at least one transcoding licenses is based at least in part on a number of unique transcoding instances, each unique transcoding instance being specific to the user, and wherein the executing the one or more transcoding jobs further includes:

determining that the user has one or more unique transcoding instances available for which a licensing cost has already been incurred; and assigning the one or more available unique transcoding instances to perform the one or more transcoding jobs of the user.

* * * * *